United States Patent [19]

Webber

[11] Patent Number: 4,929,082

[45] Date of Patent: May 29, 1990

[54] LASER LINEAR DISTANCE MEASUREMENT SYSTEM AND APPARATUS

[75] Inventor: George B. Webber, Rocky River, Ohio

[73] Assignee: Webber Gage Division of L.S.

[21] Appl. No.: 218,624

[22] Filed: Jul. 13, 1988

[51] Int. Cl.⁵ .............................................. G01B 9/02
[52] U.S. Cl. ..................... 356/358; 356/363
[58] Field of Search ............................. 356/358, 363

[56] References Cited

U.S. PATENT DOCUMENTS 4,377,036  3/1983  Dangschat ..................... 356/358 X
4,383,762  5/1983  Burkert ............................ 356/346

OTHER PUBLICATIONS

Rohlin, "An Interferometer for Precision Angle Measurements", *Applied Optics*, vol. 2, No. 7, pp. 762–763, 7/63.

Primary Examiner—Davis L. Willis
Assistant Examiner—Matthew W. Koren

[57] ABSTRACT

A laser linear measurement system wherein a laser beam is generated and directed to an interferometer and reflected by a retroreflector movably mounted on a carriage or other component and adapted to travel forward to a set point, the said retroreflector having means adapted to be fulcrumed to move forwardly or rearwardly on an arc to reflect a parallel beam to the linear measuring interferometer and secure a true linear measurement of an object to be measured.

5 Claims, 4 Drawing Sheets

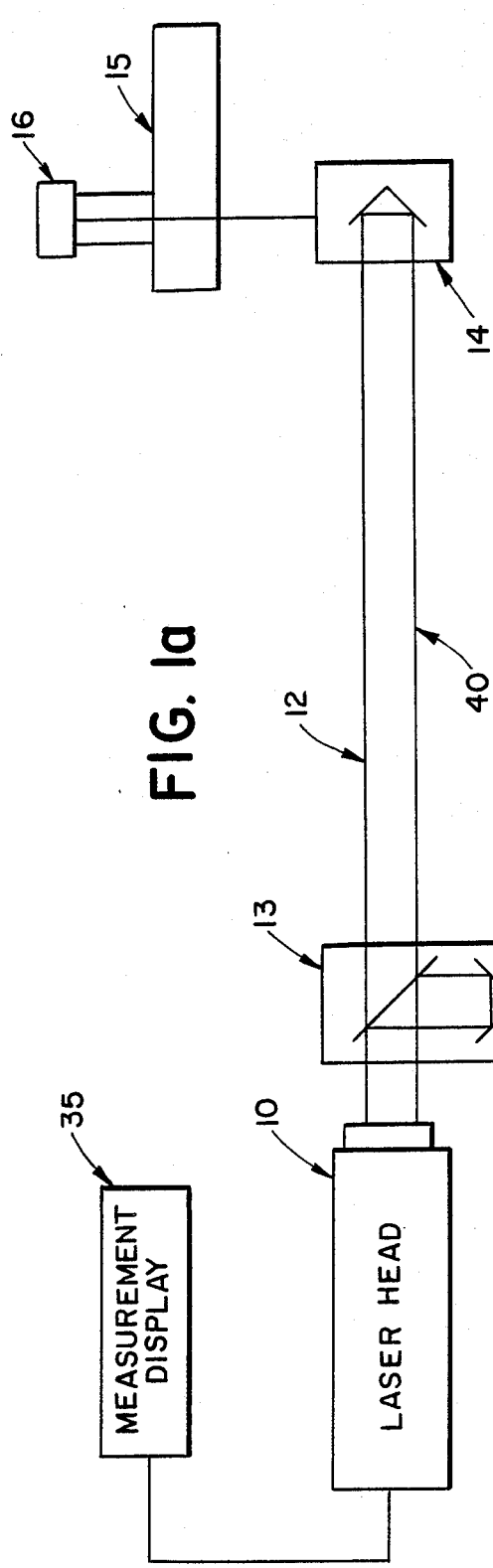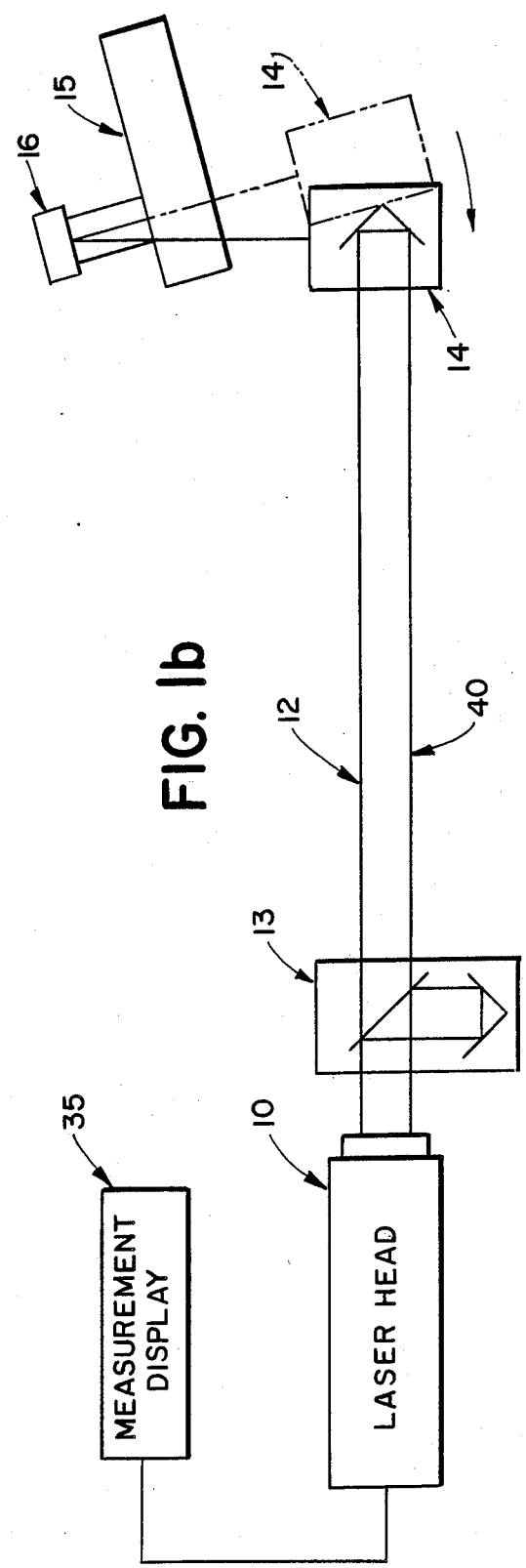

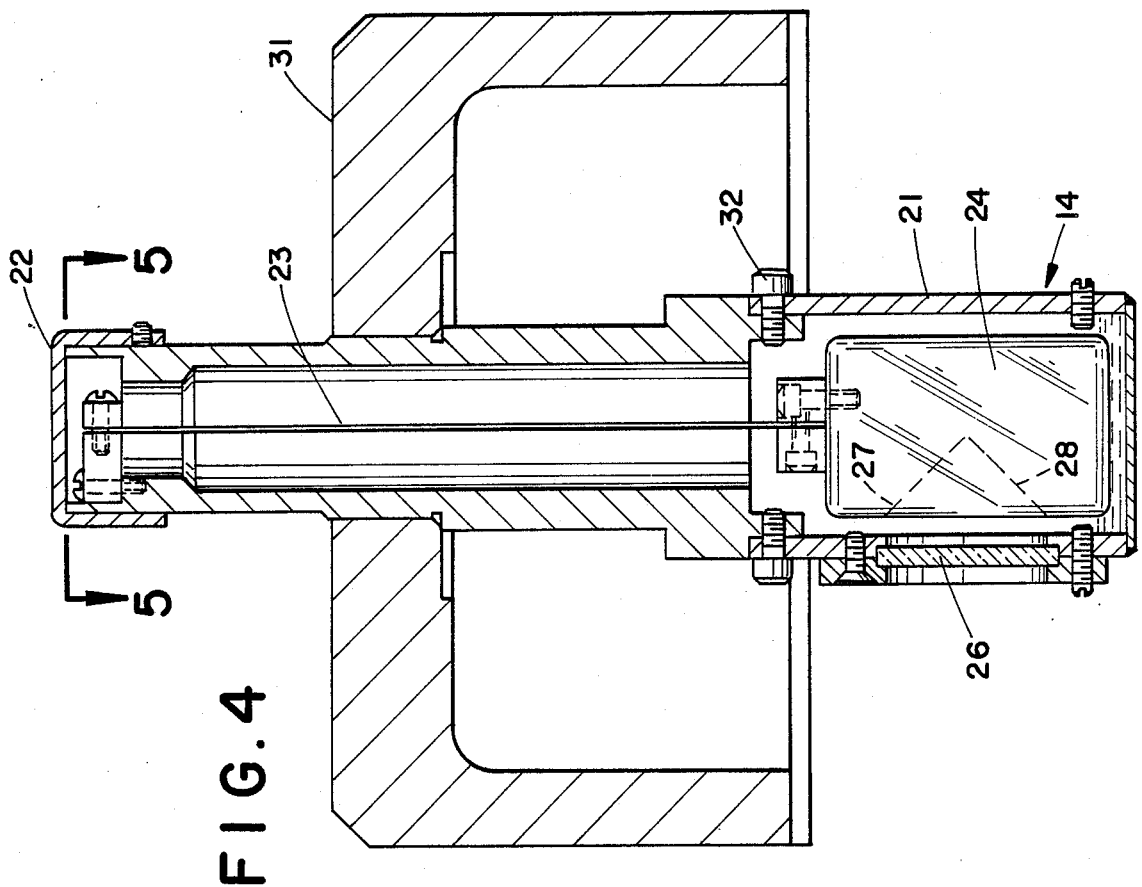

LASER LINEAR DISTANCE MEASUREMENT SYSTEM AND APPARATUS

BACKGROUND OF THE INVENTION

This invention relates to a laser linear distance measurement system and relates more particularly to a retroreflector for such systems which obtains a precise direct accurate dimensional measurement while adapting to angular displacement or pitch which in prior systems effects an Abbe offset distance about the axis of travel between the scale axis and measurement axis and makes the indicated length either shorter or longer than the actual length.

In the past, interferometric methods and apparatus have been employed in which a coherent collimated light beam, as from a laser, has been split into two parts, one of which is given a frequency shift and the other of which is reflected from the surface under investigation, as shown in U.S. Pat. No. 4,005,936 and the phase of the modulated light carrier signal is transmitted to and reflected back from a distant reflector and compared with a reference modulated light carried signal to provide a direct read-out of distance to the reflector as shown in U.S. Pat. No. 3,619,058. A beam director for an optical ranging system also has been employed for interferometrically measuring distance changes between two retroreflectors in which the beam of radiation is introduced between the two reflectors by a steering beam splitter pellicle positioned obliquely therebetween as shown in U.S. Pat. No. 4,436,417.

In such prior art methods and apparatus various compensating means are employed to compensate for Abbe's error which results from defects of the components in a geometric measurement system.

SUMMARY OF THE INVENTION

It is a primary object of this invention to provide a system and apparatus which will avoid drawbacks in prior methods.

In particular the invention provides a system and apparatus directly detecting the Abbe'-error and securing an accurate measurement.

A further object of the invention is to provide a system and apparatus whereby the retroreflector is adapted to directly compensate for Abbe'-offset errors.

Another object of this invention is to provide a retroreflector which is economical in manufacture and highly efficient and accurate in use.

Other objects of this invention and the invention itself will become more readily apparent from a purview of the following specification and drawings in which like parts are designated by like reference characters.

IN THE FIGURES:

FIG. 1a is a schematic view of a laser beam generating section including a primary laser head, an interferometer and a retroreflector in normal measurement position;

FIG. 1b is a view similar to that of FIG. 1 showing a retroreflector in fulcrumed position due to pitch;

FIG. 4 is an enlarged side sectional view of the retroreflector of FIG. 3;

FIG. 5 is a top view taken from the line 5—5 of FIG. 4.

Figure 2:
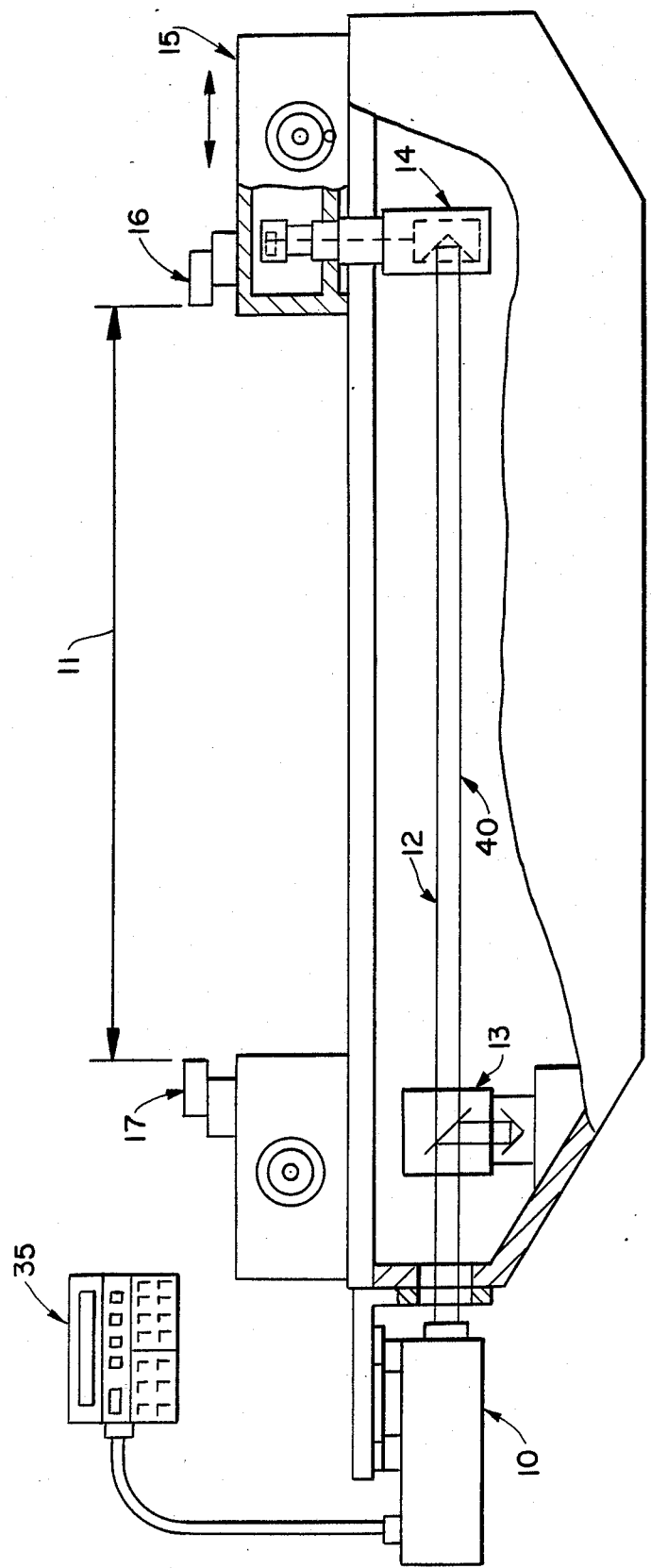
FIG. 2 is a schematic side plan view similar to that of FIG. 1 illustrating the retroreflector in section.

Referring now to the drawings, in all of which like parts are designated by like reference numerators, FIGS. 1a and 1b are optical schematics of the present invention wherein a wave length of light from a low powered helium-neon laser 10 is used as a length standard, the laser 10 generating a coherent and collimated laser beam 12 which is directed to an interferometer 13 and reflected by a retroreflector 14 in alignment therewith, the change in distance as illustrated in FIG. 2 of 11 between the measuring contact point 16 and the fixed reference point 17 is represented by the change in distance between the interferometer 13 and the retroreflector 17 as indicated on the measurement display unit 35. In order to reflect the laser beam back to the interferometer, the reflector is in alignment with the generating means as shown and the output beam redirected by the retroreflector 14 to the interferometer 13 is parallel to the beam directed to the retroreflector.

The retroreflector 14 as shown mounted below the measuring contact point 16 is carried by a movable carriage 15 and is adapted to move over the way 33, in FIG. 2 towards a fixed reference point 17. The retroreflector of the invention is fulcrumed to move forward on an arc or rearward on the same to compensate for the movement of the measuring contact point that may result from the pitch of the carriage as it moves on the way. It is movably positioned, as stated, with its optical reflecting means disposed below the way.

Figure 3:
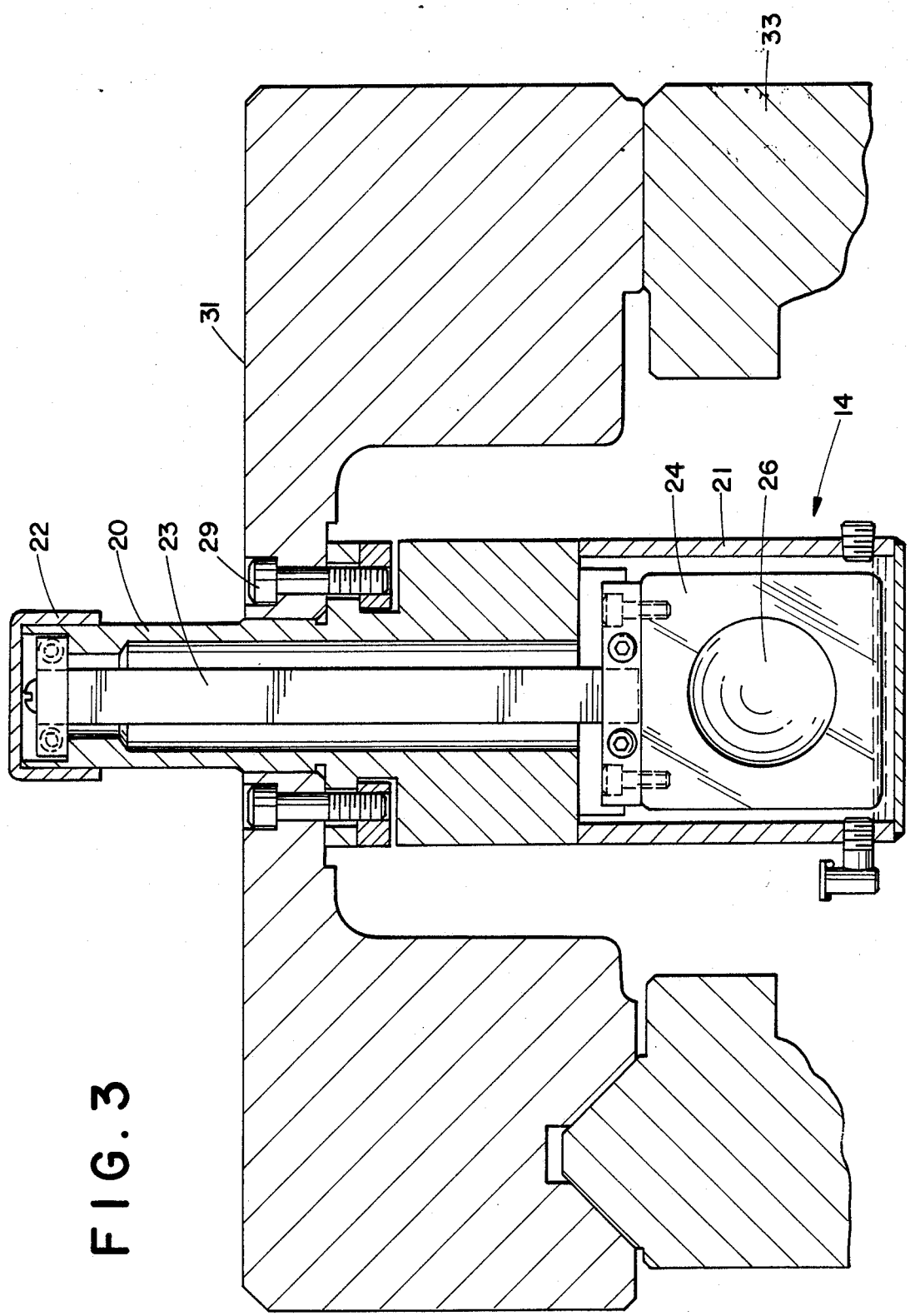
FIG. 3 is an enlarged sectional end view of the retroreflector of FIGS. 1 and 2 illustrating the mounting of the same on a carriage.

The reflector 14, as best shown in FIGS. 2, 3, 4 and 5, comprises a housing 20 of tubular form with a cup-shaped portion 21 at its lower end and a cap 22 or other enclosure on its upper end. A pendulum or reed 23 of dacron or the like is suspended freely within the elongated tubular body 30 of the reflector from the cap of the same and carries at its lower end a glass optical square 24 having intersecting angled reflecting faces 27 and 28. The same is carried as a bob on the pendulum 23 and disposed within the cup-shaped portion 21 which is provided with a reflecting optical glass 26 on the outer face thereof and angled reflecting faces 27, 28 reflect the beam through the glass 26 back to the linear measuring interferometer. In the bottom of the cup-shaped portion 21 as shown in FIGS. 3 and 4 a damper such as silicon fluid is shown at 25. The reflector, as shown in FIG. 3 is secured to the carriage 31 by bolts 29 and the tubular body 20 is secured to the cup-shaped bottom casing 21 of the housing by screws, bolts or other fastening means 32. The reflector is thus carried by the carriage toward a fixed point. The pendulum causes the reflector to be fulcrumed and move forwardly or rearwardly on an arc following the movement of the measuring contact point that may result from the pitch of the carriage as it moves over the way, hence giving an exact or true linear measurement of an object to be measured eliminating the so-called Abbe' error, which true measurement is disclosed on the counter, monitor or measurement display 35.

As shown in FIGS. 1 and 2, the reflected beam 40 to the generating section through the interferometer is parallel to the first beam 12 and enables the measurement of length of an object placed between the contact measuring point 16 and fixed reference point 17 to be true at all times.

While I have described my invention in connection with a preferred embodiment, I am aware that numerous and extensive departures may be made therefrom, such as the mounting of the reflector on various components etc., without departing however from the spirit of my invention or the scope of the appended claims.

What I claim is:

1. A linear measurement system having a laser generating source directing a first laser beam to an interferometer and thence to a retroreflector, said retroreflector adapted to move on a surface to be measured, optical reflecting means carried by a pendulum mounted within a mounting for the retroreflector adapted to reflect a laser beam directed parallel to the said first beam through the linear measuring interferometer to the laser generating source.

2. A linear measurement system as claimed in claim 1 wherein the mounting for the retroreflector has a tubular body in which the pendulum and optical reflecting means are mounted.

3. A linear measurement system as claimed in claim 1 wherein the mounting for the retroreflector has means adapted to be fulcrumed to move on an arc to reflect the retroflected beam and secure a true linear measurement.

4. A linear measurement system as claimed in claim 1 wherein the retroreflector is mounted on a carriage movable over a way toward a fixed point of measurement.

5. A linear measurement system as claimed in claim 1 wherein the retroreflector directly causes the interferometer to record a true linear measurement of an object to be measured.

* * * * *